(12) United States Patent
Rotche

(10) Patent No.: US 7,789,604 B2
(45) Date of Patent: Sep. 7, 2010

(54) REUSABLE DUNNAGE SYSTEM

(76) Inventor: Thomas H. Rotche, 5565 Preston Oaks Rd., Condo 270, Dallas, TX (US) 75254-8454

( * ) Notice: Subject to any disclaimer, the term of this patent is extended or adjusted under 35 U.S.C. 154(b) by 664 days.

(21) Appl. No.: 11/704,821

(22) Filed: Feb. 9, 2007

(65) Prior Publication Data

US 2008/0190807 A1    Aug. 14, 2008

(51) Int. Cl.
B65D 63/00 (2006.01)
B65D 81/02 (2006.01)

(52) U.S. Cl. .................. 410/117; 206/523; 206/591; 410/125

(58) Field of Classification Search ............... 206/484, 206/453, 521, 522, 523, 586, 591–594; 410/117–119, 410/125
See application file for complete search history.

(56) References Cited

U.S. PATENT DOCUMENTS

| | | | | |
|---|---|---|---|---|
| 3,246,443 A | * | 4/1966 | Slemmons | 206/484 |
| 3,667,625 A | * | 6/1972 | Lucas | 410/119 |
| 4,963,408 A | * | 10/1990 | Huegli | 428/71 |
| 5,499,413 A | * | 3/1996 | Van Hekken | 297/452.17 |
| 5,882,073 A | * | 3/1999 | Burchi et al. | 297/218.2 |
| 2005/0026528 A1 | * | 2/2005 | Forsten et al. | 442/414 |
| 2006/0048302 A1 | * | 3/2006 | Forsten et al. | 5/698 |
| 2006/0135014 A1 | * | 6/2006 | Murphy et al. | 442/304 |

OTHER PUBLICATIONS

Uline Catalog Fall/Winter 2006-2007, p. 213.

* cited by examiner

Primary Examiner—Luan K Bui
(74) Attorney, Agent, or Firm—C. W. Alworth

(57) ABSTRACT

A reusable dunnage system employing a weatherproof outer cover is disclosed. The dunnage comprises specially manufactured high density foam that will return to its original condition after suffering compression forces and the required properties of the foam are given. The outer cover is, of necessity, fire retardant, biologically inert, hypoallergenic, and provides the required weatherproofing.

1 Claim, 6 Drawing Sheets

FOAM BLOCK
FITS TIGHT INSIDE
WEATHERPROOF CASE

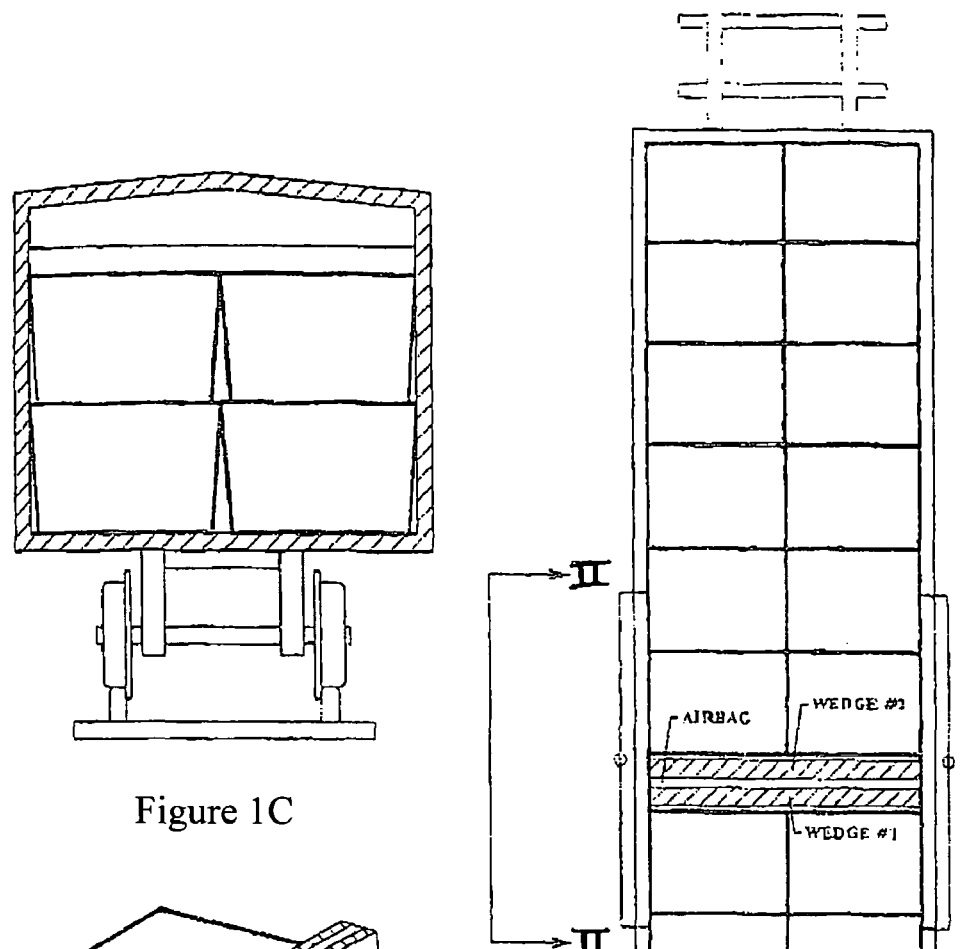
Figure 1C
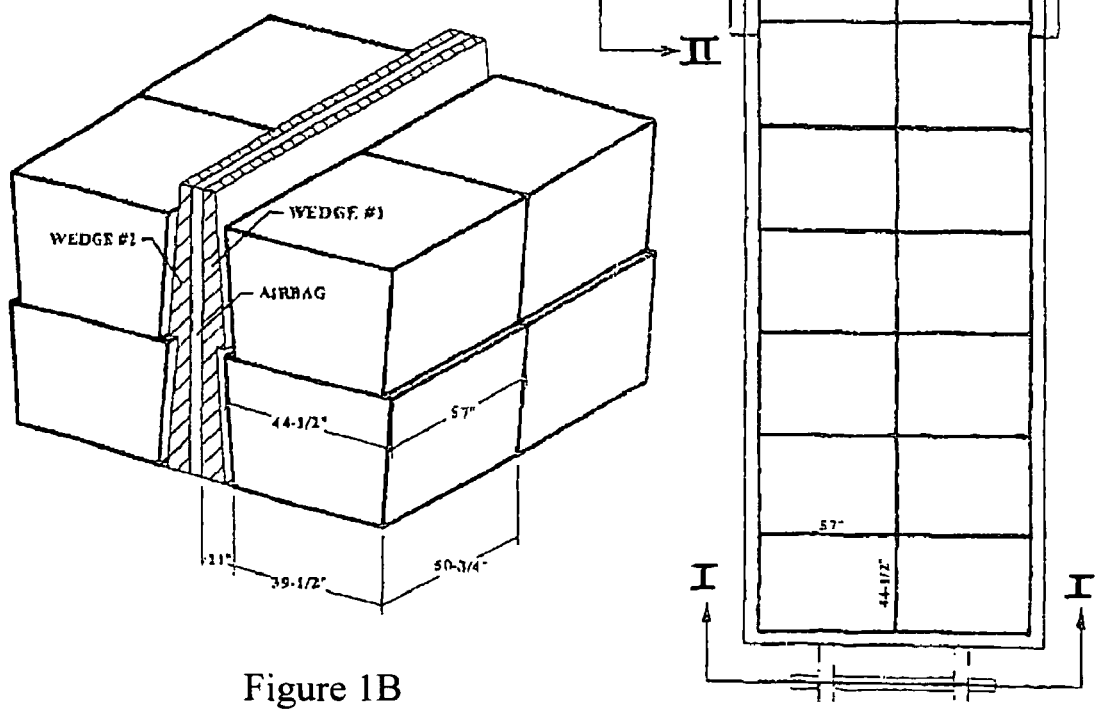
Figure 1B
Figure 1A

FOAM BLOCK
FITS TIGHT INSIDE
WEATHERPROOF CASE

TOP IS SIPPERED
CLOSED

TEST REPORT

26 September 2006

For: Murphy Industrial Products
    SUR-PAK Compression Test

Two samples were compressed using the 800,000 lbs. compression test machine. Compression load in pounds were read at every 1 inch of compression thickness.

| Size of pc. | 11.5" x 16.5" x 9" | | Large sheet – 24" x 18" compressed Sheet dim. 30" x 36" x 9" | |
|---|---|---|---|---|
| Square in. | 189.75 $^2$ in. | | 432 $^2$ in. | |
| Compressed Thickness | Load lb. | PSI | Load lb. | PSI |
| 9" | 0 | | 0 | |
| 8-3/4" | | | 1000 | 2.31 |
| 8" | 1200 | 6.32 | | |
| 7-3/4" | | | 1500 | 3.47 |
| 7" | 2000 | 10.5 | | |
| 6-3/4" | | | 2000 | 4.63 |
| 6" | 2500 | 13.2 | | |
| 5-3/4" | | | 5000 | 11.6 |
| 5" | 3000 | 15.8 | | |
| 4-3/4" | | | 6000 | 13.9 |
| 4" | 4000 | 21.1 | | |
| 3-3/4" | | | 6500 | 15.0 |
| 3" | 5000 | 26.4 | | |
| 2-3/4" | | | 7500 | 17.4 |
| 2" | 5500 | 29.0 | | |
| 1-3/4" | | | 8500 | 19.7 |
| 1" | 15000 | 79.0 | | |
| 5/8" | 80000 | 422.0 | | |
| 1/2" | | | 90000 | 208.0 |

After testing both samples rebounded to their original thickness of 9" without degradation.

These tests revealed that on this machine compressing a small block took about twice the amount of PSI force as a large sheet. If the calculated PSI is extrapolated to the sheets used in the Michelin Rail Cars (4-1/2 ft. x 5 ft. or 3240 sq. in.) the actual load handling ability of the sheet would be somewhere between 673,000 lb. and 1,367,000 lb.

Table 1

PHYSICAL PROPERTY TEST REPORT
BRANCH: 1708 BRENHAM

GRADE: 25140CMBL

DATE RAN: 1/12/2007  DATE TESTED: 1/16/2007

| DEN. RANGE: | | STD: | 2.45 | IFD RANGE: | |
|---|---|---|---|---|---|
| 2.40 | 2.50 | | | 130 | 150 |

| | DENSITY | 25% IFD | 65%IFD | 25%RIFD | ANTI-STAT |
|---|---|---|---|---|---|
| TOP-A | 2.41 | 129.6 | 280.4 | 83.2 | |
| MIDDLE-B | 2.43 | 132.7 | 285.4 | 81.0 | |
| BOTTOM-C | 2.45 | 128.6 | 278.7 | 79.4 | |

| | | | | |
|---|---|---|---|---|
| Average | 2.43 | 130.3 | 281.5 | 81.2 |
| Minimum | 2.41 | 128.6 | 278.7 | 79.4 |
| Maximum | 2.45 | 132.7 | 285.4 | 83.2 |
| Range | 0.04 | 4.1 | 6.7 | 3.8 |

| MOD: | 2.16 | FINGERNAIL | GOOD | REBOUND | 25 |
|---|---|---|---|---|---|
| HYS | 62.32 | | | | |

| | | A | B | C | AVG. |
|---|---|---|---|---|---|
| Conventional | AIRFLOW: | 3.75 | 3 | 3.5 | 3.42 |
| Gulbrandsen | AIR FLOW | | | | 0.00 |

Table 2

REUSABLE DUNNAGE SYSTEM

This invention relates to the transportation industry and in particular to dunnage, or packing, materials for the protection of goods during transportation.

BACKGROUND OF THE INVENTION

Ever since the advent of transporting cargo, maintaining the integrity of the transported goods has been an issue. Damaged product at arrival is often rejected, adding additional costs to the supplier. Thus, bracing cargo prior to shipment, in any form; has given rise to the generic term "dunnage".

Most dunnage is disposable, and is often made from wood or wood by-products, which tend to emit dust or chaffing material, making it unsuitable for some cargo applications. The waste nature of these products also adds additional cost to the receiving warehouse or plant facility.

Those products which are binned or boxed, often suffer damage when shipped via rail car. Damage occurs during the "hump" process when rail cars are switched and connected to another car resultant in a controlled bump. Freight within the car moves back and forth thus creating damaged contents. When the freight bins or boxes are of a substantial weight, attendant "G" forces tend to severally damage the containers. In order to reduce the damage the shipper will insert dunnage (packing material) between the bins or boxes to reduce any void, thereby restraining the bin or boxes within the shipping container or freight car. Inflatable dunnage is often chosen to fill these voids and the inflatable dunnage may be Kraft bags (basically a paper bag lined with poly) which are not reusable as the bag is generally slit open to remove the dunnage. Alternatively, dunnage bags may be made from toughened vinyl, which may be inflated and deflated like a balloon, thereby creating a reusable bag.

The rubber industry packages raw rubber in containers that are smaller on the bottom and larger on the top (trapezoidal in shape). Thus, upon delivery to the user (tire manufacturer) the bins are unloaded with a special set of forks (on a fork-lift) which are capable of readily turning the bin upside down, thereby easily dumping the raw rubber into a receiving point in the manufacturing process. The "hump" forces experienced by the railcar tend to damage these bins and the raw rubber will not fall out of the bins. This means that the raw rubber must manually be removed using expensive labor. Similar, problems will occur when shipping liquids (i.e., the bin can be damaged and then the contents will leak).

Shippers of raw rubber have used inflatable dunnage bags, unfortunately, these bags are not ideal. The Kraft bags tend to rip and any protection afforded the bins simply disappears. On the other hand the use of the stronger reusable vinyl dunnage bags does not help. The inflatable bag will change its internal pressure with any change in ambient temperature. For example, if the temperature drops in the shipping container, the bag essentially deflates. If the temperature rises, then the pressure builds dramatically in the bag making the bag become hard. It should be noted that the same temperature effect is experienced by Kraft bags. In both cases any protection afforded by the bags simply disappears.

Thus a strong, resilient, non-chaffing, re-useable material which serves to protect product during shipment and which is not affected by temperature changes is needed by the shipping industry.

SUMMARY OF THE INVENTION

The instant invention is specifically designed to limit or prevent container damage for products shipped via rail, truck or vessel. The instant invention comprises a specially formulated high compression high density cellular polymer with a compressive strength up to 500 psi that is placed within a weatherproof PVC backed nylon outer covering or glove thereby forming a dunnage bar that looks like a suitcase (other shapes may be employed depending on the shipment). The outer covering serves to protect the actual dunnage material. These bars can then be placed between bins during shipment. The bars will readily absorb shipping shocks.

BRIEF DESCRIPTION OF THE DRAWINGS

FIG. 1A shows the internal boxcar layout used in initial testing of the instant invention.

FIG. 1B shows a cross-sectional view of the boxcar of taken at I-I in FIG. 1A.

FIG. 1C is an isometric cross-sectional view of the boxcar taken at II-II in FIG. 1A. The instant invention is shown as a triangular dunnage (bar or wedge).

Table 1 is a test report showing the compressibility of a 9-inch sample of the material used in the instant invention.

Table 2 is a physical property test report for samples used in the instant invention.

DETAILED DESCRIPTION OF THE EMBODIMENT

Initial testing of the re-usable dunnage bar of the instant invention, was initially performed on a shipment of "Raw Rubber" contained in irregular size metal bins, each bin weighing about 3,200 pounds. The bins are shipped via rail to tire manufactures. Once received, the bins are turned upside down at the respective tire plant thereby releasing the sticky rubber. If the bins are damaged, the rubber will not fall from the bin, thus requiring additional labor to dig out the natural material.

The bins are shipped via box car, (FIG. 1), and each bin is double stacked end to end. A void is left between the bins at, or near, the rail car door. Legal requirements dictate that the void be filled with dunnage (wood or cardboard) and that an air bladder be employed as a shock absorber.

However, despite the air bladder and other dunnage the weight transfer of the cargo during shipment damages the bins. It is known that the internal pressure of the air bladder is set by ambient temperature which can drop to a low value in the winter and rise to over 120 degrees Fahrenheit during the summer. In both cases the air bladder no longer offers the need shock absorption characteristic because the temperature change has made it too soft or too hard.

A series of tests was conducted using an "engineered" dunnage. A high density cellular polymer was formed into dunnage bars and inserted between the double stacked bins, as shown in FIG. 1. In the initial tests the covering employed was basically an inexpensive PVC sheet which was to protect the bars from moisture and dirt. The tests were relatively successful and a proper approach was then taken to design a dunnage system which would be reusable and meet reasonable health standards.

Figure 2:
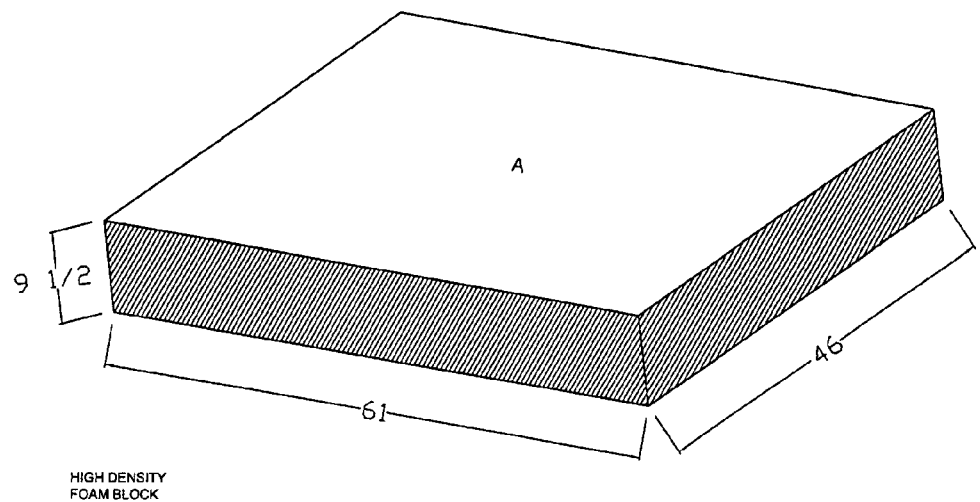
FIG. 2 depicts "High Density Foam" dimensions.

An embodiment of the instant invention is shown in FIGS. 2 through 5. FIG. 2 shows the manufactured layout of the high density foam prior to placement into weatherproof glove. The figure shows a rectangular shaped bar, but it should be noted that the instant invention may be formed in almost any shape as shown by the examples of FIG. 6. The dunnage bars of the instant invention are made of a specially formulated, high compression, polyurethane foam, with a size manufactured to rest between specific bins during rail shipment. In the railcar embodiment the dunnage bars are 9.5 inches thick, 46 inches wide and 61 inches tall. Other sizes and shapes are available as alternate embodiments, but all share the same high compression foam block.

Figure 3:
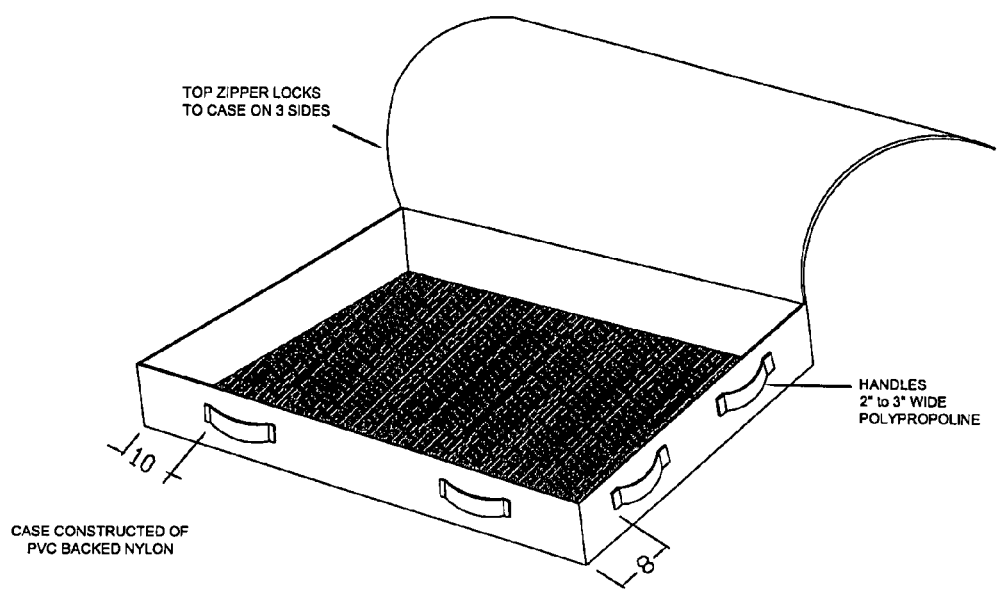
FIG. 3 shows the dimensions of the weatherproof "Glove" that encases the "High Density Foam".

As shown in FIG. 3, the glove material serves as the cradle for the dunnage bar, affording a slippery surface to allow easy insertion and definitely easy removal of the dunnage bars after cargo shifting.

The glove must be designed to be impervious to water and dust and is affixed with flexible handles on all sides, thus warehousemen can insert and extract the instant invention (dunnage bars) from any position. The preferred glove is zippered on three sides with the bottom section triple sewn for initial encasement of the foam. However, it is possible to completely sew the glove about the polymer.

The preferred dimensions of the zippered glove are 9.5 inches thick, 46 inches wide, 61 inches long for use in shipping raw rubber. The glove material is of a 15 ounce weight and the thickness of propolynewebbing for handles is 30/000 ths. Handle width is 2 to 3 inches with a length of 10 inches, placed initially 8 inches from the corner, followed by 8 handles placed equal distant from each other about the perimeter of the glove. These dimensions are not to be construed as a limitation, but rather are given so that the preferred shape may be fully understood.

Figure 4:
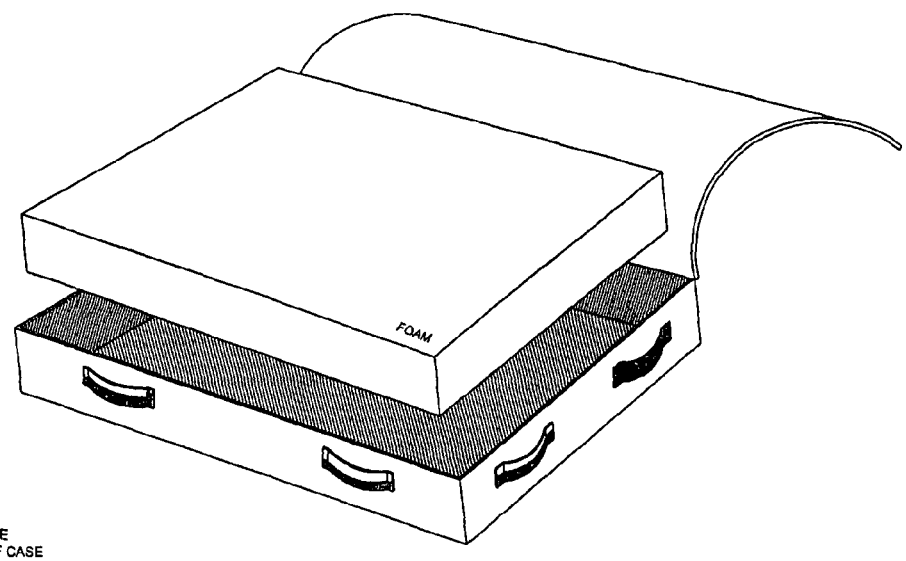
FIG. 4 represents the placement of foam into the "Glove".

FIG. 4, shows the placement of the high density foam, in its preferred shape, measuring 9.5 inches thick, and 46 inches wide and 61 inches long, and placed into the zippered weatherproof glove. The preferred glove is closed via zippered sections; however, as stated earlier, the glove may be completely sewn about the polymer.

Figure 5:
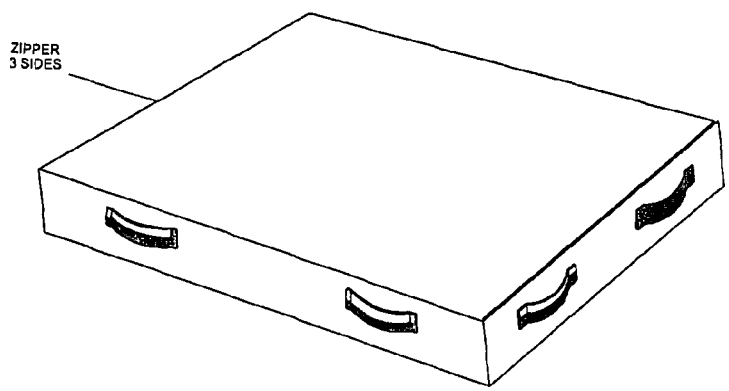
FIG. 5 shows the completed dunnage bar after encasement in the weatherproof material.
Figure 6:
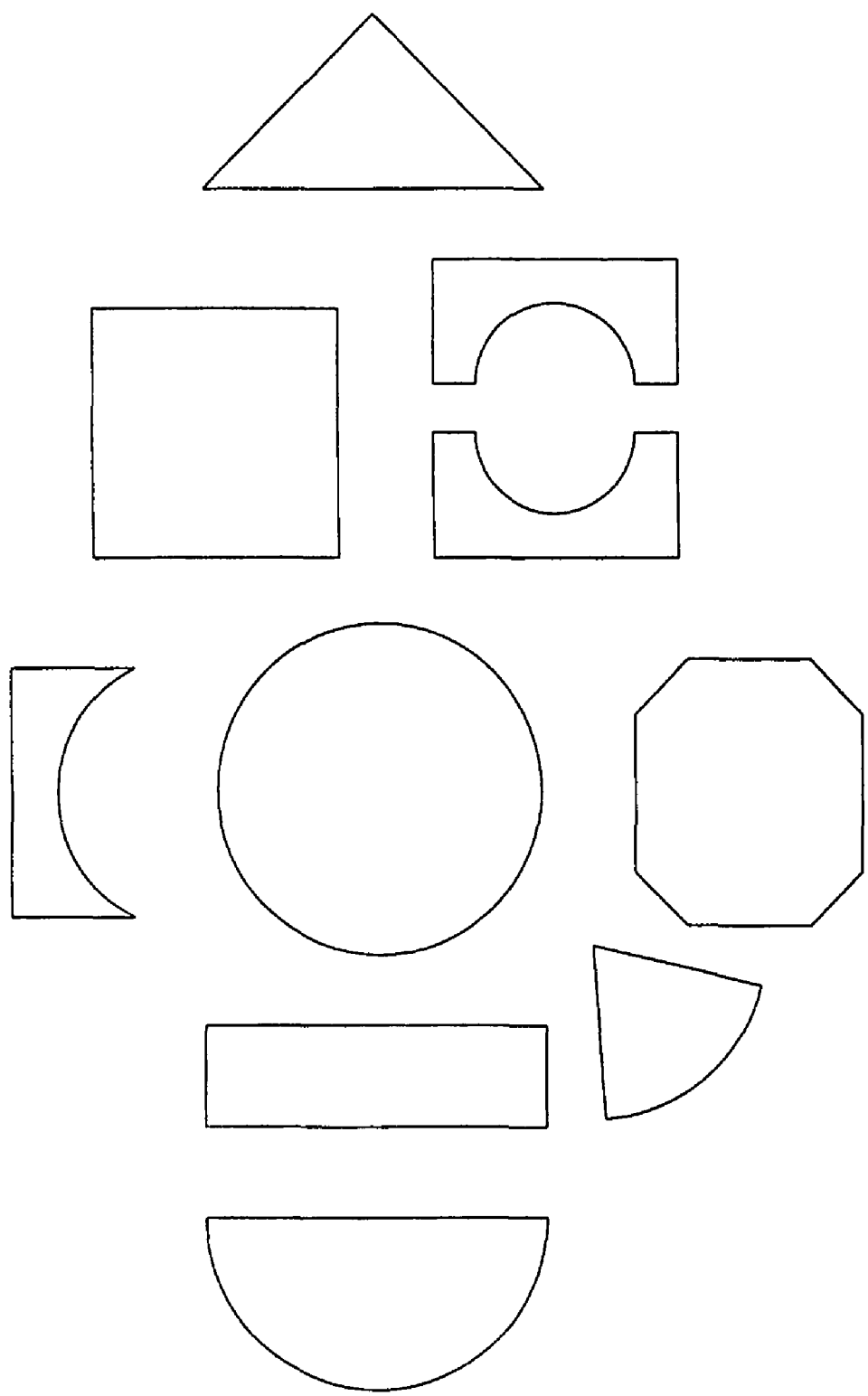
FIG. 6 shows a sample of dunnage bar shapes.

FIG. 5 shows the completed preferred prototype instant invention dunnage bar, ready for application in a railroad car used in shipping raw rubber.

The re-useable dunnage bars of the prototype are specific to certain manufactured metal bins, however can be reconfigured to meet a wide variety container sizes as shown in FIG. 6.

The outer covering or glove is necessary to ensure easy insertion and removal of the dunnage bars. It was observed during testing, that the high density, high impact cellular material had a high coefficient of friction. Of course, the coefficient of friction is always highest between similar materials, thus sliding the dunnage bars in and out past each other was difficult. Therefore, the system requires an outer covering in the form of a glove. The glove then keeps dust and dirt away from the polymer and provides the required level of health and safety. The glove must also keep rodents away from the polymer material.

The preferred glove is manufactured from PVC backed polyester having a thread count between 600 and 1000 DIN and meets the MVSS 302 and CAL117 standards for fire retardation.

The glove may be manufactured from nylon Cordura® which is a high strength ballistic material. In extreme conditions, Kevlar® may be used, and in light conditions a simple PVC backed lining may be used (i.e., Kraft paper with lining). All of the preferred glove materials are biologically inert, hypoallergenic, and provide the required weatherproofing: if the covering must be fireproof, then Kevlar® may be used.

The characteristic of the preferred polymer must be examined. Tables 1 and 2 clearly show the characteristics required to meet the requirements of the instant invention. Table 1 shows how the cellular polymer compresses and re-expands. The rebounce quality is critical to the performance of the instant invention and is related to rebound compressibility strength of the material which should be capable of accepting forces up to at least 600 psi. If the reusable dunnage did not absorb the shock by compression and then rebound to its original shape, the product being protected would be damaged during shipment. On the other hand, Table 2 shows the required Indention Force Deflection (IDF) parameters that must be met by the cellular polymer material. The density of the material may range between 1.5 and 10 and the IFD range may fall between 50 and 500.

The instant invention provides a device that will absorb the effect of colliding containers; thereby making certain that the integrity of the shipment is maintained. Furthermore the reusable system is light weight due to the properties of the materials used in the system and, depending on size, will weigh less than 50 pounds.

I claim:

1. A reusable dunnage system for use in transportation for supporting and securing goods during shipping and handling which is wedged between or beneath said goods to prevent injury from chaffing and for accepting and dissipating shock forces comprising, a high density cellular polymer having indention force characteristics ranging between 50 and 500 whereby said polymer will compress under a shock force of up to 600 psi thereby absorbing said shock force and whereby said polymer will expand back to its original size when said shock force is dissipated, an outer covering completely enclosing said polymer and affording protection from the elements by being fire retardant and water resistant while having a low coefficient of friction thereby aiding placement and removal of the reusable dunnage system.

* * * * *